United States Patent [19]
Nishijima et al.

[11] Patent Number: 5,680,884
[45] Date of Patent: Oct. 28, 1997

[54] RECTIFYING DEVICE

[75] Inventors: Shigeyuki Nishijima; Masaaki Taniguchi; Atsushi Morii; Osamu Naito, all of Nagasaki, Japan

[73] Assignee: Mitsubishi Jukogyo Kabushiki Kaisha, Tokyo, Japan

[21] Appl. No.: 639,999

[22] Filed: Apr. 30, 1996

Related U.S. Application Data

[63] Continuation of Ser. No. 354,778, Dec. 12, 1994, abandoned.

[30] Foreign Application Priority Data

Dec. 24, 1993 [JP] Japan ................... 5-326970

[51] Int. Cl.⁶ ..................................... F15D 1/02
[52] U.S. Cl. ................. 138/39; 138/42; 366/337; 366/338
[58] Field of Search ................. 138/37, 39, 42; 366/337, 338

[56] References Cited

U.S. PATENT DOCUMENTS

| | | | |
|---|---|---|---|
| 1,307,635 | 6/1919 | Nielsen | 138/37 |
| 3,286,992 | 11/1966 | Armeniades et al. | |
| 3,424,437 | 1/1969 | Shearer | 138/42 |
| 3,893,654 | 7/1975 | Miura et al. | 366/337 |
| 4,208,136 | 6/1980 | King | 138/37 |
| 4,211,277 | 7/1980 | Grosz-Röll et al. | 138/42 |
| 4,374,542 | 2/1983 | Bradley | 366/337 |
| 4,466,741 | 8/1984 | Kojima | 138/37 |
| 4,660,587 | 4/1987 | Rizzie | 138/37 |
| 4,806,288 | 2/1989 | Nowosinski et al. | 366/337 |
| 5,124,086 | 6/1992 | Schultz | 366/338 |

FOREIGN PATENT DOCUMENTS

| | | | |
|---|---|---|---|
| 2 078 986 | 5/1971 | France | |
| 654827 | 12/1937 | Germany | |
| 2262016 | 6/1974 | Germany | |
| 0226194 | 8/1985 | Germany | 366/337 |
| WO86/06296 | 11/1986 | WIPO | |
| WO90/10497 | 9/1990 | WIPO | |

*Primary Examiner*—David Scherbel
*Assistant Examiner*—James F. Hook
*Attorney, Agent, or Firm*—Wenderoth, Lind & Ponack

[57] ABSTRACT

A high-performance rectifying device promotes the diffusion of energy, temperature and concentration in a fluid stream with a small pressure loss. The device is a lattice type rectifying device provided within a fluid flow passageway for equalizing the flow velocity distribution of the same fluid. Lattice elements each consist of two triangular plates disposed so as to form two opposed surfaces of a pyramid having its apex on the downstream side of the fluid flow and two other triangular plates forming two opposed surfaces of another pyramid having its apex jointed with the first-mentioned apex and having its bottom surface positioned on the downstream side of the fluid flow. The latter two opposed surfaces have their orientations deviated by 90 degrees from the two opposed surfaces on the upstream side. The lattice elements are arrayed in juxtaposition in directions perpendicular to the fluid flow with the orientation of adjacent lattice elements deviated by 90 degrees from each other and are connected in such a manner that the bottom surfaces of the above-mentioned pyramids may form a lattice. Furthermore the ratio of the length, in a direction parallel to the flow, of the lattice element to the breadth, in the direction perpendicular to the flow, of the lattice element should be kept in a range of 1.5–2.0. The lattice element may also be formed of a rectangular plate twisted by 90 degrees in the direction along the direction of the fluid flow.

11 Claims, 3 Drawing Sheets

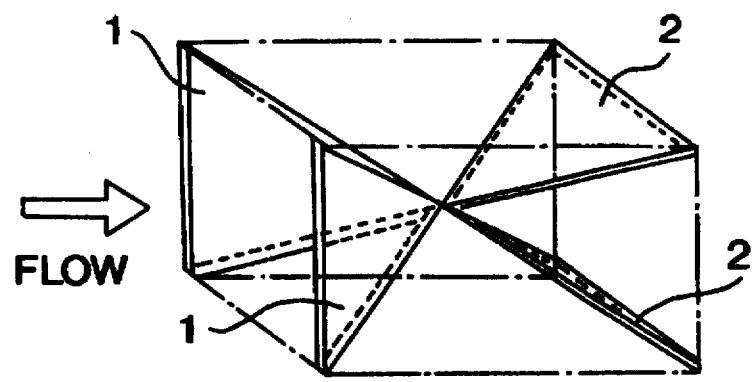
FIG. 1
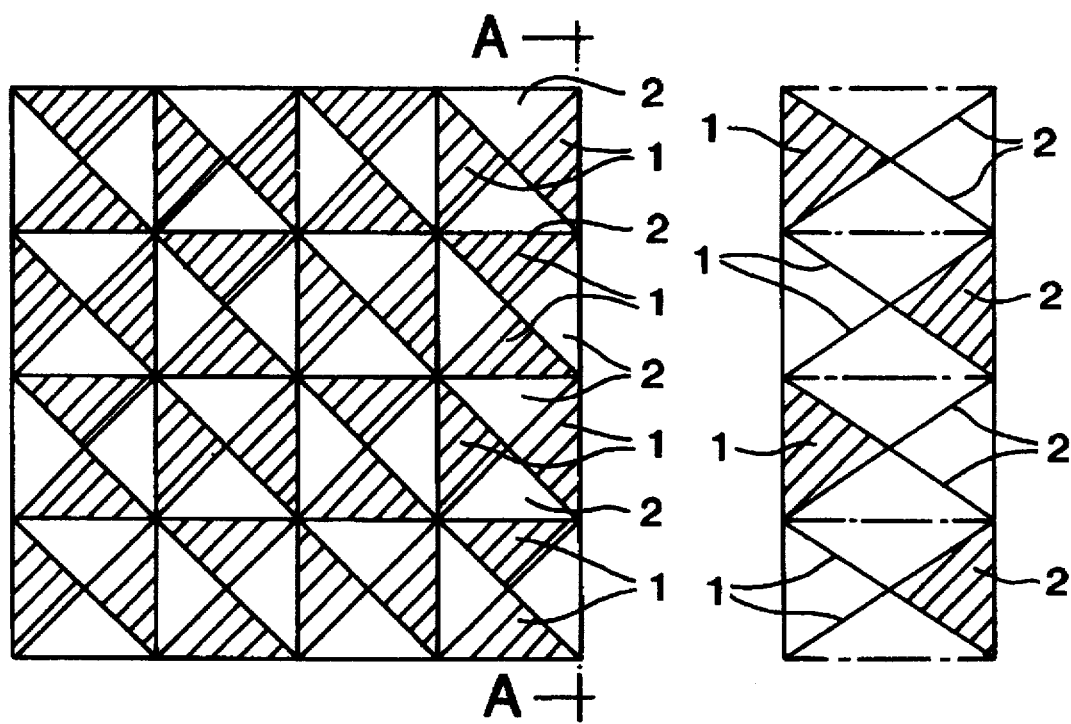
FIG. 2A
FIG. 2B

RECTIFYING DEVICE

This application is a continuation of now abandoned application, Ser. No. 08/354,778, filed Dec. 12, 1994.

BACKGROUND OF THE INVENTION

1. Field of the Invention

The present invention relates to a rectifying device which is applicable to an apparatus necessitating the realization of a uniform flow within a predetermined zone of a fluid flow passageway, such as a denitriding/desulfurizing apparatus for exhaust gases or a chemical reactor.

2. Description of the Prior Art

In the case of an apparatus necessitating a chemical reaction process in a flow of fluid, such as a denitriding/desulfurizing apparatus for exhaust gases or a chemical reactor, in order to efficiently effect the desired reaction, in many instances it is necessary to control the distribution of velocity, temperature and the reactive substance concentration of the fluid so as to fall within predetermined ranges.

However, in many cases, these apparatuses are normally positioned in a complicated duct system or a three-dimensional piping system. Consequently a large imbalance would be generated in the flow due to bending, expansion and contraction of the ducts and pipings, and as a result, the case where the reaction performance is degraded is often encountered.

As a counter-measure for the above-mentioned disadvantage, the prior art has generally employed a system trying to enhance the rectifying effect by providing a turbulent lattice or a perforated plate on the upstream side of a reaction apparatus to stir and mix the flow.

However, the above-mentioned system in the prior art still leaves the following problems to be resolved.

In order to equalize the flow velocity and temperature distribution and the concentration distribution in a flow within a duct or a piping, it is necessary to promote mixing and diffusion of energy, temperatures and substance, and so, it is necessary to generate, as large as possible, turbulences (vortexes) in the flow.

However, in the case of a turbulent lattice consisting of a combination of circular or rectangular posts, which has heretofore been frequently utilized, since the size of the generated turbulence is determined by the scale of constituent elements of the lattice, if it is intended to generate large turbulences, the lattice constituent members (circular or rectangular posts) and the lattice intervals must be made large. Therefore, there is a shortcoming in that the scale of the lattice was physically limited, and also the pressure loss was increased.

On the other hand, in the case of a perforated plate, since it is one kind of resistive rectifying device, although it could have excellent performance for equalizing a flow velocity distribution by well investigating the size and interval of perforations, there is a shortcoming in that the promotion of diffusion can not be expected as much, and the pressure loss is large.

Here, the term "pressure loss" means energy lost from a flow due to flow resistance, and it is defined by the following Equation-(1):

$$\Delta p = C_D \cdot p_D = C_D \cdot r/2g \cdot v^2 \qquad \text{Equation-(1)}$$

where $\Delta p$: pressure loss (Kg/m$^2$ or mmH$_2$O), $C_D$: coefficient of pressure loss, $p_D$: dynamic pressure of fluid (Kg/m$^2$ or mmH$_2$O), g: gravitational acceleration (=9.8 m/s$^2$), r: density of fluid (Kg/m$^3$), and v: velocity of fluid (m/s).

A coefficient of pressure loss $C_D$ of a lattice or a perforated plate is mainly determined by an opening ratio (the ratio of an area through which fluid passes in a lattice interval or a perforation part with respect to a cross-sectional area of a whole flow passageway). The coefficient of pressure loss of a commonly used lattice or perforated plate having an opening ratio of about 40–30% has a considerably large value of 3–6. This is a shortcoming of the above-described rectifying devices in the prior art caused by the fact that as shown in FIG. 6, a lattice or a perforated plate 10 is a mechanism for partly blocking the flow of fluid with its constituent members, and thereby generating vortexes 11.

SUMMARY OF THE INVENTION

It is therefore one object of the present invention to provide a high-performance rectifying device which overcomes the shortcomings of the above-mentioned known systems in the prior art, and which simultaneously promotes the diffusion of energy, temperature and concentration, and also has a small pressure loss.

According to one feature of the present invention, there is provided a lattice type rectifying device provided within a fluid flow passageway for equalizing a flow velocity distribution of the fluid. Lattice elements each consisting of two triangular plates are disposed so as to form two opposed surfaces of a pyramid having its apex on a downstream side of the aforementioned fluid flow and two other triangular plates forming two opposed surfaces of another pyramid having its apex jointed with the first-mentioned apex and having its bottom surface positioned on the downstream side of the aforementioned fluid flow. The latter two opposed surfaces have their orientation deviated by 90 degrees from the former two opposed surfaces on the upstream side. The lattice elements are arrayed in juxtaposition in the directions perpendicular to the fluid flow with the orientations of adjacent lattice elements deviated by 90 degrees from each other and are connected in such a manner that the bottom surfaces of the above-mentioned pyramids may form a lattice. A ration (L/B) the of the length (L) of the lattice in a direction parallel to the flow to the breadth (B) of the element in the direction perpendicular to the flow falls in the range of 1.5–2.0.

According to another feature of the present invention, there is provided a lattice type rectifying device for rectifying a fluid flow wherein lattices are adapted to divide a flow passageway into a large number of rectangular flow passageways and are formed of rectangular plates. Each upstream end of the plates is disposed so as to form a side of a rectangular entrance of each lattice. The above-mentioned rectangular plates forming each lattice are twisted by 90 degrees in the same direction along the direction of the flow. Each downstream end of the rectangular plate (3) forms a side of a rectangular exit of each lattice, and a ratio (L/B) of the length (L) in the direction parallel to the flow (after the rectangular plates are twisted) to a breadth (B) in the direction perpendicular to the flow falls in the range of 1.5 to 2.0.

According to the present invention, in the case of a rectifier consisting of a combination of triangular plates as first featured above, when a fluid flow coming from the upstream side passes through the inside of the rectifier, it is bent obliquely towards the opening surface of the pyramid. It is also given a swirl flow component in the direction perpendicular to the flow due to the fact that the opening surface is changed in direction by 90 degrees. Hence vortexes are generated on the downstream side of the obliquely disposed triangular plate, and as a result, a large turbulence can be obtained.

Also, according to the present invention, in the case of a swirling lattice type rectifier as second featured above, when a fluid flow coming from the up-stream side passes through the inside of the rectifier, since it flows along the twisted lattice plate, swirl flows are generated for each lattice plate and as a result of interfering with each other, a large swirl flow is generated.

The swirl flow generated by causing a flow to revolve in the above-described manner would result in strong turbulence in the case where the height in the direction of the flow of the pyramid formed by the triangular plates is low or in the case where the degree of twisting of the swirling lattice plate is large, and the mixing effect would be large. But in the case where the height of the pyramid is high or in the case where the degree of twisting of the swirling lattice plate is gentle, the generated swirl flow would be weak, and the mixing effect would also be small.

However, it is to be noted that since the pressure loss is also proportional to the intensity of the generated swirl flow, in order to obtain a large mixing effect with a low pressure loss, it is necessary to preset a ratio (L/B) (of a length (L) in the flow direction of the constituent two pyramids in the case of a triangular plate lattice or a length (L) of the lattice plate after it is twisted by 90 degrees in the case of the swirling lattice) to a breadth (B) in the direction perpendicular to the flow of the lattice constituent element within a predetermined range.

Here, the rectifying effect for a flow velocity and a mixing effect for the temperature and concentration are defined as represented by the following Equation-(2):

$$K = L_{max} - L_{min}/G_{max} - G_{min} \quad \text{Equation-(2)}$$

where

K: Index of an equalizing effect for a flow velocity, a temperature or a concentration, $G_{max}$: Maximum value of flow velocity, temperature or concentration within a flow passageway in the case where a rectifier is not equipped, $G_{min}$: Minimum value of flow velocity, temperature or concentration within a flow passageway in the case where a rectifier is not provides, $L_{max}$: Maximum value of flow velocity, temperature or concentration within a flow passageway after a rectifier has been provided, and $L_{min}$: Minimum value of flow velocity, temperature or concentration within a flow passageway after a rectifier has been provided.

With respect to a triangular plate (pyramid) lattice and a swirling lattice, the index of an equalizing effect K was experimentally sought while variously changing the ratio L/B, and the results are graphically shown in FIG. 5.

As seen from FIG. 5, with respect to both the triangular plate (pyramid) lattice and the swirling lattice, if the ratio L/B is 1.5 or less, a coefficient of pressure loss $C_D$ is large, while if the ratio L/B is 2.0 or more, the mixing performance (the inverse of an equalizing effect L/K) lowers abruptly. Therefore the range where the requirement for a low pressure loss and a high mixing performance can be fulfilled is the range of L/B=1.5–2.0.

The coefficient of pressure loss in this range is 1.1 with respect to a triangular plate (pyramid) lattice, and 0.6 with respect to a swirling lattice, which is an extremely small value as compared to that of a perforated plate as in prior art. It is seen that, according to the present invention, the requirements for a low pressure loss and a high mixing performance can be simultaneously fulfilled.

BRIEF DESCRIPTION OF THE DRAWINGS

The above-mentioned and other objects, features and advantages of the present invention will become more apparent by reference to the following description of preferred embodiments of the invention taken in conjunction with the accompanying drawings.

In the accompanying drawings:

FIG. 1 is a schematic perspective view showing a construction of an essential part of a first preferred embodiment of a rectifying device according to the present invention;

FIG. 2 is an illustration of a general construction of the rectifying device of FIG. 1, FIG. 2(a) being a front view, and FIG. 2(b) is a side view as viewed in the direction of arrows A in FIG. 2(a);

DESCRIPTION OF THE PREFERRED EMBODIMENTS

The preferred embodiments of the present invention will now be described with reference to the accompanying drawings.

An essential part of a first preferred embodiment of a rectifying device according to the present invention is shown in FIG. 1, and a general construction of the first preferred embodiment is shown in FIG. 2.

Figure 5A:
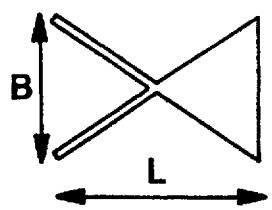
FIG. 5 is an illustration of a lattice element according to the present invention and a diagram showing experimental data for mixing performance and a pressure loss characteristic, FIG. 5(a) being an illustration of a dimensional ratio of a triangular plate (pyramid) lattice element, FIG. 5(b) being an illustration of a dimensional ratio of a swirling lattice element, and FIG. 5(c) being a diagram showing experimental data for mixing performance (an index of equalizing effect) and a coefficient of pressure loss.
Figure 5B:
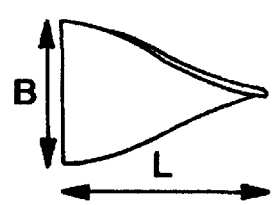
Figure 5C:
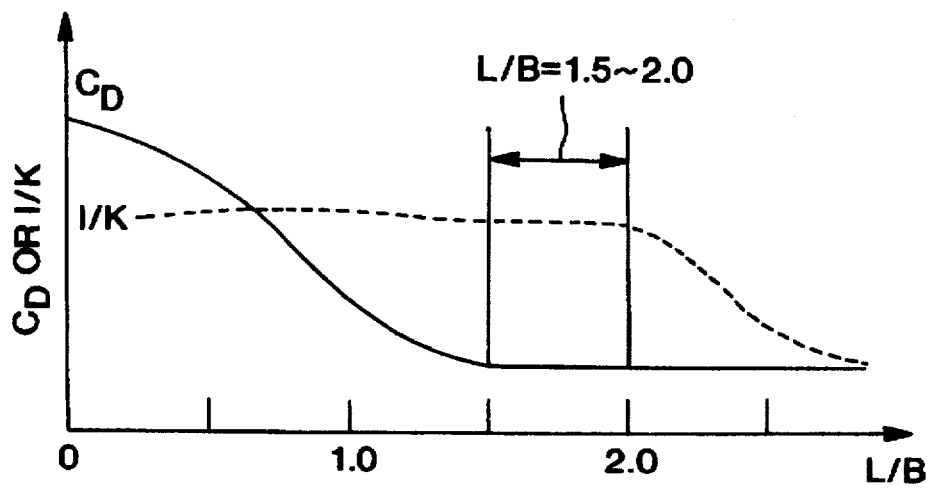
Figure 6:
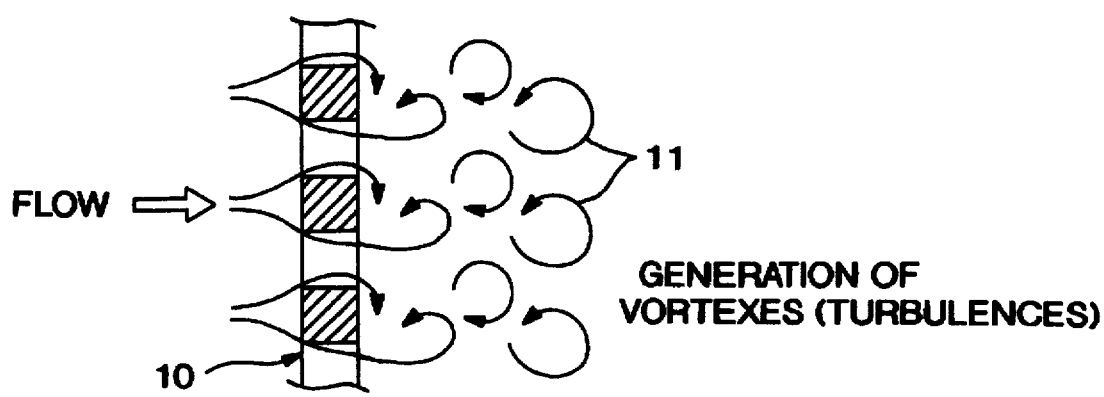
FIG. 6 is a conceptional view of the generation of vortexes by means of a lattice or perforated plate rectifying device in the prior art.

FIG. 1 shows constituent elements of a triangular plate (pyramid) lattice type rectifier, in which on an upstream side, two opposed surfaces of a pyramid are formed of two triangular plates 1, and on a downstream side, two opposed surfaces of another pyramid, having its apex jointed with the apex of the first-mentioned pyramid on the upstream side and having its orientation deviated by 90 degrees from the first-mentioned pyramid, are formed of two triangular plates 2. The ratio of length to breadth (L/B) of a lattice is defined to be in the range of 1.5–2.0 (See FIG. 5).

FIG. 2 shows one example of a rectifier consisting of a combination of sixteen constituent elements, in which the constituent elements of the lattice shown in FIG. 1 are arrayed in juxtaposition with the orientations of adjacent lattice constituent elements deviated by 90 degrees from each other, and by combining any necessary number of constituent elements in this way, a rectifier having an arbitrary cross-sectional area can be formed.

Figure 3:
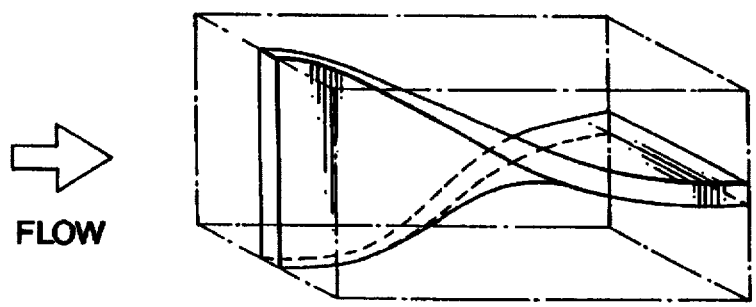
FIG. 3 is a schematic perspective view showing a construction of an essential part of a second preferred embodiment of a rectifying device according to the present invention.
Figure 4A:
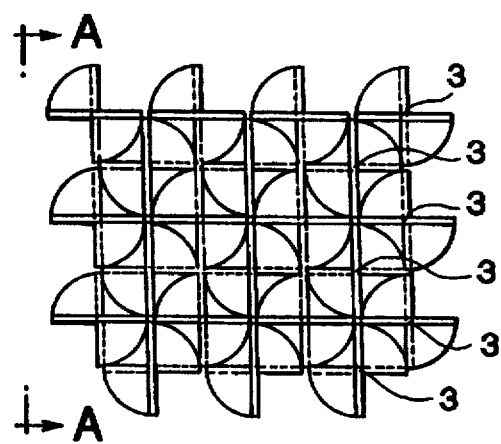
FIG. 4 is an illustration of a general construction of the rectifying device of FIG. 3, FIG. 4(a) being a front view, and FIG. 4(b) being a side view as viewed in the direction of arrows A in FIG. 4(a)
Figure 4B:
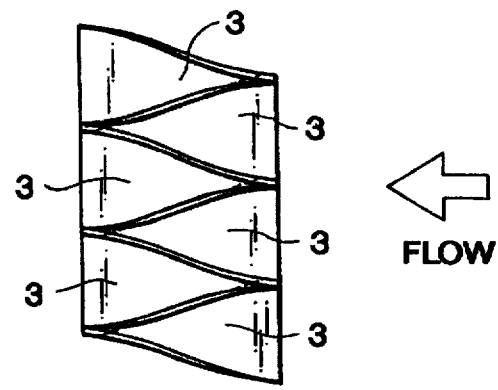

An essential part of a second preferred embodiment of a rectifying device according to the present invention is shown in FIG. 3, and a general construction of the second preferred embodiment is shown in FIG. 4.

FIG. 3 shows a constituent element of a swirling lattice type rectifier in which one example of a lattice plate 3, formed by twisting an elongated plate in the clockwise direction as viewed in the downstream direction, is illustrated in perspective.

FIG. 4 shows one example of a rectifying device consisting of a combination of twenty one constituent elements as shown in FIG. 3 with all of the adjacent lattice plates 3 twisted in the same direction, and by combining any necessary number of constituent elements in this way, a rectifier having an arbitrary cross-sectional area can be formed.

While two representative preferred embodiments of the present invention have been described above, the present invention is characterized in that the ratio (L/B) of the length (L) of the lattice constituent element to the breadth (B) of the same element is limited to within the range of 1.5–2.0, and except for this condition, the construction of the rectifying device according to the present invention should not be limited to the above-described preferred embodiments.

For instance, a absolute dimensions of the lattice constituent element is arbitrary. Hence a rectifying device of various sizes can be chosen depending upon the size of a duct or piping. Also, the providing rectifying devices according to the present invention in two stages along the direction of the fluid flow, a rectifying devices having various degree of performance can be obtained.

In the first preferred embodiment discussed above, the upstream triangular plates 1 form first triangular plates that are connected to and disposed opposite to each other so as to form opposite surfaces of a first imaginary pyramid having an apex that points in the downstream direction, with a bottom that is upstream of the apex. The triangular plates 2 form second triangular plates that are connected to and disposed opposite to each other to form opposite surfaces of a second imaginary pyramid that has an apex pointing in the upstream direction and a bottom that is downstream of the apex. Each of the first two and second two triangular plates have a bottom edge at the respective bottoms of the imaginary pyramids formed thereby. Further, the apexes and the centers of the bottoms of the respective imaginary pyramids all lie along a straight line, as can be appreciated from the various drawing figures. The bottom of the first imaginary pyramid, further, is perpendicular to the direction of fluid flow, as can be further appreciated from the drawing figures and the above discussion. The deviation in the orientation between the first and second triangular plates in each lattice element is seen by looking in the direction of flow, i.e. in a plane perpendicular to the direction in which the respective first and second triangular plates extend from each other from the point at which the respective apexes meet.

As described in detail above, according to the present invention, since the rectifying device is constructed so as to generate large vortexes on the downstream side of the lattice plates, a high-performance rectifying device which simultaneously promotes the diffusion of energy, temperature and concentration, and has a small pressure loss, can be provided.

While a principle of the present invention has been described above, it is intended that all matter contained in the above description and illustrated in the accompanying drawings shall be interpreted to be illustrative, and not as a limitation on the scope of the present invention.

What is claimed is:

1. A rectifying device, comprising:
   a plurality of lattice elements connected to each other so as to form a lattice, said lattice being disposed within a fluid passageway having a direction of fluid flow with an upstream direction and a downstream direction;
   wherein each of said plurality of lattice elements comprises
      first two triangular plates connected to and disposed opposite to each other to form opposite surfaces of a first imaginary pyramid having an apex pointing in the downstream direction and a bottom upstream of the apex, and
      second two triangular plates connected to and disposed opposite to each other to form opposite surfaces of a second imaginary pyramid having an apex pointing in the upstream direction and a bottom downstream of the apex,
   where said first two and said second two triangular plates each have a bottom edge,
   where said first two triangular plates and said second two triangular plates are arranged relative to each other such that the apexes of the respective imaginary pyramids meet and said second two triangular plates have an orientation that deviates by 90 degrees from the orientation of said first two triangular plates, the apexes and the centers of the bottoms of the respective imaginary pyramids all lie along a straight line, and the bottom of the first imaginary pyramid is perpendicular to the direction of fluid flow, and
   where each of said plurality of lattice elements has a length in a direction parallel to the direction of fluid flow and a breadth in a direction perpendicular to the direction of fluid flow;
   wherein said plurality of lattice elements are arrayed in said lattice so as to be juxtaposed in directions perpendicular to the direction of fluid flow;
   wherein adjacent ones of said plurality of lattice elements are oriented with a 90 degree deviation relative to each other and are connected to each other such that said bottom edges of said first two and said second two triangular plates form a lattice; and
   wherein the ratio of the length to the breadth of each of said plurality of lattice elements is 1.5 to 2.0.

2. The rectifying device of claim 1, wherein in each one of said plurality of lattice elements each of said first two and said second two triangular plates is connected to the others of said first two and said second two triangular plates at respective apexes of said triangular plates.

3. The rectifying device of claim 1, wherein each one of said plurality of lattice elements consists of said first two and said second two triangular plates.

4. The rectifying device of claim 3, wherein said rectifying device consists of said plurality of lattice elements.

5. The rectifying device of claim 1, wherein said rectifying device consists of said plurality of lattice elements.

6. The rectifying device of claim 1, wherein said lattice comprises at least one row of said lattice elements extending in a direction perpendicular to the direction of fluid flow for equalizing the flow velocity distribution of a fluid flowing through said fluid passageway.

7. A rectifying device, comprising:

a plurality of lattice elements connected to each other so as to form a lattice;

wherein each of said plurality of lattice elements comprises
- first two triangular plates having respective apexes connected to each other and respective bottom edges separated from each other, and
- second two triangular plates having respective apexes connected to each other and respective bottom edges separated from each other,
- where said apexes of said first two triangular plates and said apexes of said second two triangular plates are connected to each other at a point such that said first two triangular plates and said second two triangular plates extend away from each other from said point in a predetermined direction and are arranged such that the orientation of said second two triangular plates deviates from the orientation of said first two triangular plates by 90 degrees as seen in a plane perpendicular to the predetermined direction, and
- where each of said plurality of lattice elements has a length in the predetermined direction and a breadth in a direction perpendicular to the predetermined direction;
- wherein said plurality of lattice elements are arrayed in said lattice so as to be juxtaposed in directions perpendicular to the predetermined direction;
- wherein adjacent ones of said plurality of lattice elements are oriented with a 90 degree deviation relative to each other and are connected to each other such that said bottom edges of said first two and said second two triangular plates form a lattice; and
- wherein the ratio of the length to the breadth of each of said plurality of lattice elements is 1.5 to 2.0.

8. The rectifying device of claim 7, wherein each one of said plurality of lattice elements consists of said first two and said second two triangular plates.

9. The rectifying device of claim 8, wherein said rectifying device consists of said plurality of lattice elements.

10. The rectifying device of claim 7, wherein said rectifying device consists of said plurality of lattice elements.

11. The rectifying device of claim 7, wherein said lattice comprises at least one row of said lattice elements extending in a direction perpendicular to the direction of fluid flow for equalizing the flow velocity distribution of a fluid flowing through said fluid passageway.

* * * * *